United States Patent [19]

Knepper et al.

[11] Patent Number: 5,569,750
[45] Date of Patent: Oct. 29, 1996

[54] RTV SILICONE COMPOSITIONS USING AMINOHYDROCARBYL-SUBSTITUTED KETOXIMINOSILANES

[75] Inventors: Jeffrey A. Knepper, Branchburg; Dale R. Flackett, Somerset; Edward T. Asirvatham, Madison, all of N.J.

[73] Assignee: AlliedSignal Inc., Morris County, N.J.

[21] Appl. No.: 248,118

[22] Filed: May 24, 1994

[51] Int. Cl.[6] ............................. C08K 5/24; C08L 83/04; C08G 77/04
[52] U.S. Cl. .................. 524/731; 524/864; 524/863; 528/33; 528/38
[58] Field of Search .................. 524/863, 864, 524/731; 528/33, 38

[56] References Cited

U.S. PATENT DOCUMENTS

| 2,938,009 | 5/1960 | Lucas | 260/37 |
|---|---|---|---|
| 3,004,859 | 10/1961 | Lichtenwalner | 106/308 |
| 3,189,576 | 6/1965 | Sweet | 260/46.5 |
| 3,274,145 | 9/1966 | Dupree | 260/37 |
| 3,635,743 | 1/1972 | Smith | 106/288 Q |
| 3,837,878 | 9/1974 | Beers | 106/308 Q |
| 4,380,660 | 4/1983 | Mathew et al. | 556/422 |
| 4,400,527 | 8/1983 | Mathew et al. | 556/422 |
| 4,546,017 | 10/1985 | Flackett et al. | 427/387 |
| 4,657,967 | 4/1987 | Klosowski et al. | 524/860 |
| 4,705,877 | 11/1987 | Gornowicz et al. | 556/422 |
| 4,720,530 | 1/1988 | Würminghausen et al. | 528/18 |
| 4,973,623 | 11/1990 | Haugsby | 524/863 |

FOREIGN PATENT DOCUMENTS

| 0399682A2 | 11/1990 | European Pat. Off. |
| 0565318A1 | 10/1993 | European Pat. Off. |
| 94/06806 | 3/1994 | WIPO |

Primary Examiner—Karen A. Dean
Attorney, Agent, or Firm—Lois A. Gianneschi

[57] ABSTRACT

A room temperature vulcanizable silicone rubber composition with crack resistant properties with improvement during cure, comprising a silanol end-stopped diorganopolysiloxane polymer; a methyl tris-(methyl ethyl ketoximino)silane crosslinker, an aminohydrocarbyl substituted ketoximinosilane adhesion promoter; a reinforcing or non-reinforcing filler or filler mixture, and an optional catalyst and plasticizer. These compositions cure to elastic materials useful as caulking materials, adhesives, coatings and encapsulating materials for the construction and other industries.

21 Claims, No Drawings

RTV SILICONE COMPOSITIONS USING AMINOHYDROCARBYL-SUBSTITUTED KETOXIMINOSILANES

BACKGROUND OF THE INVENTION

The invention relates to single component silicone compositions which cure at room temperature to form elastomeric products. More particularly the invention relates to room temperature vulcanizable (RTV) silicone rubber compositions containing aminohydrocarbyl-substituted ketoximino silanes as adhesion promoters to attain an improved crack resistance during cure, as well as improved stability of cure during shelflife.

U.S. Pat. No. 3,189,576 describes certain oxime silanes as useful intermediates in one component room temperature curing coating and caulking applications. The disclosed class of organosilicons consists of oxime substituents including methyl ethyl ketoxime. However, aminohydrocarbyl-substituted ketoximino silanes are not disclosed. U.S. Pat. No. 4,705,877 describes aminohydrocarbyl substituted ketoximinosilanes as coupling agents, however, no use as an adhesion promoter in room temperature vulcanizable silicone rubber compositions is suggested. Many other patents issued to date describe the usefulness of oxime silanes as crosslinkers and methods of compounding RTV caulking materials with oxime silanes. It is also known in the art to use organofunctional silanes as adhesion promoters for ketoximino silane crosslinked one component RTV's. U.S. Pat. No. 4,720,530 teaches one component silicone RTV using ketoximinosilanes as crosslinkers and aminoalkylalkoxy silanes as adhesion promoters. Not known in the art however, is the use or advantage of aminohydrocarbyl-substituted ketoximino silanes as an adhesion promoter in one component room temperature vulcanizing silicone sealants. This invention has found the advantage of aminohydrocarbyl-substituted ketoximino silanes as adhesion promoters in one component room temperature vulcanizing silicone sealants which also use ketoximino silanes or alkoxy-ketoximino silanes as crosslinkers.

DESCRIPTION OF THE INVENTION

The invention provides a storage stable, silicone composition which is curable to an elastomer in the presence of moisture which comprises:

(A) at least one silanol terminated diorganosiloxane polymer in an amount sufficient to form a silicone composition which is curable to an elastomer upon crosslinking; and (B) optionally at least one silane crosslinking agent in an amount sufficient to crosslink the diorganosiloxane polymer in the presence of moisture;

(C) optionally at least one filler in an amount sufficient to thicken the silicone composition; and (D) at least one aminohydrocarbyl substituted ketoximinosilane adhesion promoter in an amount sufficient to increase the adhesion of the composition to a substrate.

The invention also provides a method of producing such a storage stable silicone composition by first forming a mixture of components A and D and thereafter adding components B and C to the mixture. The invention further provides a method of producing such a storage stable silicone composition by first forming a mixture of components A, B and C and thereafter adding component D to said mixture.

The compositions of the present invention are stable at room temperature when protected from moisture, but cure when exposed to moisture. The composition contains at least four ingredients, (A) at least one hydroxyl endblocked polyorganosiloxane polymer, (B) a tri- or tetra-functional ketoximinosilane crosslinker or blends thereof, (C) a reinforcing or non-reinforcing filler and (D) an aminohydrocarbyl-substituted ketoximino silane adhesion promoter. Optionally a catalyst (E), a plasticizer (F) and various other additives (G) are included.

The composition contains (A) a silanol terminated diorganosiloxane polymer as a basic ingredient which may have a viscosity generally between 100 to 500,000 centipoise at 25° C., preferably from about 100 to about 350,000 centipoise and most preferably from about 2,000 to 150,000 centipoise. One preferred polymer has the formula

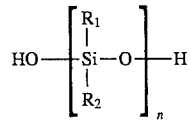

where n varies such that the viscosity of the polymer varies from 100 to 500,000 centipoise. The organo groups $R_1$ and $R_2$ are independently monovalent hydrocarbon radicals or monovalent halogenated carbon radicals. Preferably the organic radicals are methyl, ethyl, phenyl, vinyl, and 3,3,3-trifluoropropyl. The polydiorganosiloxane can additionally have monoorganosilsesquioxane units, triorganosiloxy units, and $SiO_2$ units. Polydiorganosiloxanes which have both hydroxyl endblocking and triorganosiloxy endblocking are known in the art and are described in U.S. Pat. No. 3,274,145 which is incorporated herein by reference. Polymer (A) can also be a mixture of two or more of the above described polyorganodisiloxanes as long as the average viscosity of the mixture falls within the range stated above. The amount of polymer (A) used in this invention ranges from above 15 to about 90 percent by weight of the total composition but preferably ranges from about 30 to about 70 percent by weight. The polymers useful for this invention are commercially available from such suppliers as Wacker Silicones of Adrian, Mich., Miles of Pittsburgh, Pa. and PPG of Guerney Gurnee, Ill.

The crosslinking agent (B) preferably has the formula: $R_{4-n}Si(OR')_p(ON=CR'R''')_{n-p}$, where R and R' independently of each other, may be any saturated, straight chain or branched alkyl radical having 1 to 8 carbon atoms, n is 0 to 4, p is 0 to 3 where the sum of n and p is at least three, and R" and R''', independently of each other, may be any saturated straight chain or branched alkyl radical of 1 to 8 carbon atoms. While it is generally preferred that the crosslinker have three or four ketoximino groups as the hydrolyzing radicals, alkoxy-ketoximino silanes are also included in this invention. When an alkoxy group is present in the above alkoxy-ketoxime formula, usually it exists as a mixture. That is, for a tetrafunctional silane, there may be a mixture of tetraketoximino, triketoximino-monoalkoxy, diketoximino-dialkoxy, and trialkoxy-monoketoxime silanes. Similarly trifunctional silanes may exist as mixtures of triketoximino, diketoximino-monoalkoxy, and monoketoxime-dialkoxy silane, etc. The method for preparing such ketoximino and alkoxy-ketoximino silanes is known in the art from U.S. Pat. Nos. 4,380,660 and 4,400,527. Also useful as crosslinkers herein are those silanes described in U.S. patent application Ser. Nos. 947,015 filed Sep. 17, 1992 now U.S. Pat. No. 5,359,108; 143,777 filed Nov. 1, 1993 now U.S. Pat. No. 5,405,984 and 158,660 filed Nov. 29, 1993 now U.S. Pat. No. 5,405,930. These patents and applications as well as U.S. Pat. No. 3,189,576 are hereby incorporated by reference. Non-limiting examples of ketoximes are methyl ethyl ketoxime, diethylketone oxime, acetone oxime, methyl isobutyl ketoxime, methyl amyl ketoxime, cyclohexanone oxime, etc. The most preferred oxime in this invention is methyl ethyl ketoxime. The preferred crosslinking agents are methyl tris-(methyl ethyl ketoximino) silane and vinyl tris-(methyl ethyl ketoximino) silane. Crosslinkers useful for this invention are commercially available from Allied-Signal, Inc. of Morristown, N.J. Crosslinker (B) can be present in an amount of from about 2 to about 20 percent by weight of the total composition, however from about 3 to about 7 percent by weight is preferred and from about 3 to about 6 percent by weight is most preferred. Although it is preferred that a single crosslinker (B) be used in this invention, it is also within the purview of this invention to provide a composition which uses mixtures of crosslinkers. These include but are not limited to methyl tris-(methyl isobutyl ketoximino) silane, vinyl tris-(methyl isobutyl ketoximino) silane, tetrakis-(methyl ethyl ketoximino) silane, tetrakis-(methyl isobutyl ketoximino) silane, tetrakis-(methyl amyl ketoximino) silane. The following may also be present in the composition as modulus modifiers: dimethyl bis-(methyl ethyl ketoximino) silane, methyl vinyl bis-(methyl ethyl ketoximino) silane, methyl vinyl bis-(methyl isobutyl ketoximino) silane, and methyl vinyl bis-(methyl amyl ketoximino) silane. Tetrafunctional alkoxy-ketoxime silanes as disclosed in U.S. Pat. Nos. 4,657,967 and 4,973,623 can also be used as crosslinkers and are incorporated herein by reference. Crosslinker (B) is preferably added to the composition after adhesion promoter (D) has been added in order to achieve a faster curing composition. The crosslinker may also be added after the mixture of polymer and plasticizer, but if it is added before (D) during the cure of the composition a slow rubberization time will result.

The composition of the invention also contains a filler (C) which may be a reinforcing silica filler, a semireinforcing filler, a non-reinforcing filler or mixtures thereof. Examples of reinforced silica fillers are described in U.S. Pat. Nos. 3,837,878; 2,938,009; 3,004,859, and 3,635,743 which are incorporated by reference. The amounts of reinforcing fumed silica used ranges from 0 to about 20 percent by weight of the total composition, preferably from about 0 to about 14 percent by weight and most preferably 2 to 8 percent by weight. Reinforcing fumed silicas impart increased tensile strength of the cured composition as well as providing thixotropic character to the uncured composition. A non-reinforcing or semi-reinforcing filler can also be used. These include ground or precipitated calcium carbonate, ground quartz, silica aerogel, diatomaceous earth, iron oxide, titanium oxide, aluminum oxide, zirconium silicate, calcined clay, magnesium oxide, talc, wollastonite, hydrated alumina, and carbon black. These fillers may used in an amount ranging from 0 to about 70 percent by weight of the total composition. The total amount of all fillers in the composition ranges from at least about 3% to about 70% and preferably from about 6% to about 55% by weight of the overall composition. The fillers are usually added after the crosslinker and polymer have been mixed, and are so included under anhydrous conditions. Reinforcing fillers are commercially available from Degussa of Dublin, Ohio, and Cabot Corp. of Tuscola, Ill. Non-reinforcing fillers are available from Georgia Marble of Atlanta, Ga., Pfizer of Easton, Pa. and Omya of Proctor, Vt.

The composition also contains an adhesion promoter (D) which is an aminohydrocarbyl-substituted ketoximinosilane represented by the formula $(R^3R^4C=NO)_xR^5_{(3-x)}SiR^6NHR^7$, where $R^3$ and $R^4$ are identical or different monovalent straight chain or branched hydrocarbon radicals, preferably containing 1 to 20 carbon atoms and more preferably from 1 to 6 carbon atoms. In one preferred embodiment, $R^3$ and $R^4$ together form a cycloalkyl group. In another preferred embodiment, $R^3$ and $R^4$ are respectively methyl and ethyl. $R^5$ is a monovalent hydrocarbon radical, a monovalent fluorinated hydrocarbon radical, or an alkoxy group containing from 1 to 4 carbon atoms, with the proviso that when more than one $R^5$ substituent is present these substituents can be identical or different. $R^6$ is a divalent hydrocarbon radical having from 2 to 20 carbon atoms, $R^7$ is a monovalent hydrocarbon radical or a hydrogen atom, and x is the integer of 1, 2 or 3. The adhesion promoter (D) can be made by any means known in the art such as that shown in U.S. Pat. No. 4,705,877 which is incorporated herein by reference. The amount of adhesion promoter may range from about 0.5 to about 5 percent, preferably 0.5 to 1.5 percent by weight of the total composition. Typically (D) exists as mixtures of amino alkyl alkoxy-ketoximino silanes. For example gamma-aminopropyldiketoximino-monoalkoxy silane, gamma-aminopropyltriketoximino silane, and gamma-aminopropyldialkoxy-monoketoxime silane will exist together in a mixed adhesion promoter (D). Preferably gamma-aminopropyldiketoximino-monoalkoxy silane would be in the highest concentration of such mixtures. Of the total amount of adhesion promoter (D), the x=1 moiety may be present in an amount of from about 2 to about 45 weight percent, preferably from about 3 to about 42 weight percent and most preferably from about 5 to about 20 weight percent. The x=2 moiety may be present in an amount of from about 20 to about 90 weight percent, preferably from about 21 to about 88 weight percent and most preferably from about 50 to about 70 weight percent. The x=3 moiety may be present in an amount of from about 0 to about 50 weight percent, preferably from about 1 to about 46 weight percent and most preferably from about 1 to about 10 weight percent. The x=0 moiety may be present in an amount of from about 0 to about 1 weight percent. In the preferred embodiment, each other non-oxime substituent on the silane is a $C_1$ to $C_4$ alkoxy radical and most preferably methoxy or ethoxy. How (D) is used and added to the composition of this invention is also significant. Mixing order and level of addition is important to the resulting cure of the sealant. When adhesion promoter (D) is added to the mixture of polymer and plasticizer (or without plasticizer) and (D) is added before crosslinker (B), a faster curing sealant results. This occurs at levels near or about 1 percent (D) by weight to the total composition. Less than 1 percent may not provide a fast curing sealant. More than 1% could provide an even faster curing sealant. A faster cure as defined by rubberization time can be obtained compared to identical compositions utilizing a prior art aminoalkylalkoxy silane as the adhesion promoter.

The composition may further contain an optional catalyst (E) in the which accelerates the reaction of polymer (A) with crosslinker (B). Examples of component (E), non-exclusively include organotin carboxylates such as dibutyltin dilaurate, dibutyltin diacetate, dibutyltin dioctoate, dibutyltin maleate, dialkyl tin hexoates, dioctyltin dilaurate, iron octanoate, zinc octanoate, lead octanoate, cobalt naphthenate, etc. Use levels of catalyst can range from 0 to about 2 percent, preferably from about 0.01 to about 2 percent and most preferably from about 0.02 to about 0.1 percent by weight of the total composition. Catalysts useful for this invention are available commercially from Elf Atochem of Philadelphia, Pa. and Witco Chemical Company of Houston, Tex.

The composition may also contain an optional plasticizer (F) to improve the extrusion properties and to modify the modulus of the cured composition. This is may be a triorganosilyl endblocked diorganopolysiloxane having a viscosity ranging from 10 to 100,000 centipoise at 25° C. where the organic groups are monovalent hydrocarbon radicals, preferably alkyl radicals of 1 to 8 carbon atoms. The organo groups may also be monovalent hydrocarbon radicals including alkenyl radicals, monovalent radicals, cycloalkyl, and haloalkyl radicals. The plasticizer is added in an amount ranging from 0 to 40 percent and preferably from about 10 to about 30 percent based on the weight of the entire composition. Preferred viscosity of the plasticizer ranges from about 100 to about 1000 centipoise at 25° C. Generally the plasticizer, if it is used in the composition, is preferred to be added to polymer (A), before the adhesion promoter (D) and crosslinker (B) is added. It can also be added after polymer (A) and adhesion promoter (D) have been added. Plasticizers useful for this invention are commercially available from such suppliers as Wacker Silicones of Adrian, Mich. Miles of Pittsburgh, Pa. and PPG of Gurnee Ill.

Other optional additives (G) may be added such as antioxidants, thixotropic agents, fungicides, mildewcides, ultraviolet ray absorbers, heat resistance improving agents, flame retardants, thermal and electrically conductive fillers, heat stabilizers, colorants, etc. to tailor the composition to a specifically desired application. These usually may be added at any stage of the mixing operation. These may be present in an amount ranging from about 0 to about 10 weight percent based on the entire composition.

The composition is cured to a silicone elastomer by exposure to atmospheric moisture at the time of use when the package is broken. When formulated, the composition provides a one component sealant with improved cracking resistance under movement during cure. Cure profile (defined by skinover time, tackfree time, and rubberization time) as well as cracking resistance can be adjusted by choice of crosslinkers, fillers, adhesion promoters and catalysts. Skinover time is the time which it takes for ambient moisture to form a thin skin on the outer surface of a laid down film of the sealant composition. Rubberization time is the time which it takes for ambient moisture to essentially provide a nick resistant layer on the surface of the sealant composition. For a composition to be considered as having good crack resistance, for the purpose of this invention, the difference between skinover time and rubberization time should be less than thirty minutes. Crack resistance for this invention means resistance to forming cracks under movement of a bead of the composition during its cure. Often the cure profile of prior art oxime crosslinked sealants deteriorates over time. That is, the tack free time and the rubberization time of such compositions increase dramatically during shelflife compared to these values for freshly made sealant. As this happens, the crack resistance of the composition under movement during cure tends to deteriorate. The composition of this invention which uses an aminohydrocarbyl substituted ketoximino silane has a significantly improved stability to tack free time, skinover time and rubberization time during an extended shelflife. A composition with a fast and stable cure profile that is crack resistant even after long storage is provided. Prior art RTV compositions using aminoalkyl alkoxy silane type adhesion promoters produce compositions whose time to rubberization is less than thirty minutes when the composition is freshly formulated. However, within two weeks of shelf storage time, the composition often or typically shows a double or triple time to rubberization. With the composition of the present invention, the time to rubberization remains stable over time. That is, the rubberization time will remain substantially the same after several months of shelflife.

The order of addition of the components is important to the cure profile obtained in the resulting sealant. In the most preferred embodiment, one first forms a mixture of the polymer (A) and adhesion promoter (D). Crosslinker (B) and filler (C) are thereafter added in either order or simultaneously. This provides the fastest curing sealant.

In a lesser preferred embodiment, one first mixes polymer (A) with crosslinker (B) and filler (C) which are added in either order or simultaneously. Thereafter adding adhesion promoter (D) is added to the mixture. If (D) is added after the crosslinker and filler, very long rubberization times result.

Compositions prepared in such manner tend to have reduced crack resistance to movement during cure but have an unusually high elongation and low modulus which is advantageous in certain contexts.

The following non-limiting examples serve to illustrate the invention. All parts in the examples are by weight.

EXAMPLE 1

A silanol-terminated polydimethylsiloxane (65.9 parts) having a viscosity of 50,000 centipoises at 25° C. is thoroughly mixed with a triorganosilyl endblocked diorganopolysiloxane (20 parts) having a viscosity of 1000 centipoise at 25° C. and 1 part of the following aminohydrocarbyl-substituted ketoximinosilane mixture (which is referred to below as adhesion promoter A):

7% methyl ethyl ketoxime

12% gamma-aminopropyl dimethoxy-(methyl ethyl ketoximino) silane

72% gamma-aminopropyl bis-(methyl ethyl ketoximino)-methoxy silane

3% gamma-aminopropyl tris-(methyl ethyl ketoximino) silane 5.5% dimers and high boilers 0.5% gamma-aminopropyltrimethoxysilane The components are mixed in a Ross double plantary mixer fitted with a vacuum port. This composition is mixed together for 10 minutes under vacuum. Next, 5 parts of methyl tris-(methyl ethyl ketoximino) silane are added to the above composition and mixed under vacuum for 15 minutes. Untreated fumed silica (130 m2/gm) is added next (8 parts) to the composition. The fumed silica is mixed without vacuum until the filler is wetted by the liquid portion of the composition. The fumed silica is then mixed under vacuum for 10 minutes. To this composition 0.1 part dibutyltindilaurate is added last and mixed under vacuum for 10 minutes. This is known as composition #1.

Composition #2 is prepared similarly as composition #1 except that the order of addition is changed for the adhesion promoter A. Ingredients and amount of each ingredient are the same as composition #1. Adhesion promoter A is added after the addition of fumed silica. That is, methyl tris-(methyl ethyl ketoximino) silane is added together with polymer and plasticizer and mixed 15 minutes under vacuum. Fumed silica is added similarly as in composition #1 followed by the addition of adhesion promoter A. Dibutyltindilaurate is then added last and mixed under vacuum for 10 minutes.

Composition #3 is prepared similarly to composition #1 except that gamma-aminopropyltrimethoxysilane is used in place of adhesion promoter A.

Composition #4 is prepared similarly to composition #2 except that gamma-aminopropyltrimethoxysilane is used in place of adhesion promoter A.

The freshly prepared compositions are drawn down on polyethylene sheets to a thickness of approximately 2 mm and exposed to normal laboratory atmospheric conditions (approximately 50% R.H. and 22° C.) for one week. The physical properties of the freshly cured materials are then measured using dumbbell shaped pieces cut from the sheet (DIN 53 504, Die type S 2, 4 mm×2 mm×75 mm) and a Lloyd L500 tensile testing machine. The samples are tested according to the West German standard DIN 53 504. A Lloyd non-contacting infrared extensometer TTOX10/1000 is used. Hardness is measured using a Shore A durometer located on a platform (conveloader) with a standard load and velocity. Shore A measurements are taken instantaneously. Skin over time (SOT) is measured by observing the time from exposure of the composition to moisture until a finger lightly touched to the surface of the curing composition is withdrawn without transfer of the composition to the finger. The tack free time (TFT) is the time measured from the exposure of the composition until a piece of polyethylene sheet is placed on the composition with slight pressure and withdrawn without transfer of the composition to the polyethylene. Scratch time or rubberization time is measured from the time of exposure to the point where a finger gently moves a small area of the sealant and no crack in the surface of the composition occurs. Table I shows results from both the freshly made sealant (less than 24 hours old) and thermally aged tubes of the compositions described above. The thermally aged sealants are measured using the same procedures and test equipment as previously described.

TABLE I

| Composition # | Hardness (Shore A) | Elongation @ break (%) | Force @ break (N/mm2) | Tensile @ 100% elongation (N/mm2) | SOT (min) | TFT (min) | Scratch (min) |
| --- | --- | --- | --- | --- | --- | --- | --- |
| #1 | 12 | 438 | 1.15 | 0.23 | 35 | 50 | 43 |
| #2 | 12 | 930 | 1.25 | 0.21 | 4 | 45 | 195 |
| #3 | 18 | 538 | 1.37 | 0.31 | 5 | 27 | 220 |
| #4 | 20 | 476 | 1.45 | 0.38 | 5 | 22 | 225 |
| AFTER AGEING 21 DAYS @ 50° C. | | | | | | | |
| #1 | 17 | 305 | 0.82 | 0.32 | 13 | 40 | 65 |
| #2 | 16 | 650 | 1.38 | 0.27 | 7 | 51 | 128 |
| #3 | 20 | 467 | 1.37 | 0.35 | 6 | 30 | 143 |
| #4 | 20 | 397 | 1.13 | 0.35 | 10 | 30 | 100 |

As can be plainly seen from composition #1, the scratch time is decreased dramatically when the ketoxime substituted amino alkyl adhesion promoter is added to the polymer before the addition of crosslinker. This is unexpected. What is even more surprising is that the fast scratch/rubberization time is achieved without the use of faster curing crosslinkers such as vinyl tris-(methyl ethyl ketoximino) silane or tetra-(methyl ethyl ketoximino) silane.

Compositions #3 and #4 show the same formulation using the alkoxy counterpart (gamma-aminopropyltrimethoxysilane) as adhesion promoter. Both sealants have long and undesirable scratch times. These results (of compositions 1–4) demonstrate the novelty (as well as the importance of the method of addition) of ketoxime substituted aminoalkyl silanes.

EXAMPLE 2

A series of compositions is prepared employing the same method of mixing as described in Example 1.

Composition #5: a silanol-terminated polydimethylsiloxane (65.95 parts) having a viscosity at 25° C. of 50,000 centipoises is thoroughly mixed with a triorganosilyl end-blocked diorganopolysiloxane (20 parts) having a viscosity of 1000 centipoise at 25° C. and an adhesion promoter B (1 part) similarly as in composition #1. All three components are mixed under vacuum for 10 minutes. Adhesion promoter B has the following composition:

50–55% gamma-aminopropyl bis-(methyl ethyl ketoximino) methoxy silane

30–35% gamma-aminopropyl dimethoxy-(methyl ethyl ketoximino) silane

1–5% methyl ethyl ketoxime

3% tetrakis-(methyl ethyl ketoximino) silane.

Vinyl tris-(methyl ethyl ketoximino) silane (5 parts) is added to the composition and mixed for 10 minutes under vacuum. Fumed silica (130 m2/gm) is added next (8 parts) in similar manner as described in composition #1. Dibutyltin dilaurate (0.05 parts) is added last in a similar manner as composition #1.

Composition #6: This material is prepared similarly to composition #5 except that gamma-aminopropyltrimethoxysilane is used in place of adhesion promoter B.

Composition #7: This material is prepared similarly to composition #5 except that phenyl tris-(methyl ethyl ketoximino) silane is used as the crosslinker and that 25 parts of plasticizer, and 60.95 parts of polymer are used. Dibutyltin dilaurate (0.05 parts) is added last.

Composition #8: This material is prepared similarly to composition #7 except that gamma-aminopropyltrimethoxysilane is used in place of adhesion promoter B.

Composition #9: This material is prepared similarly to composition #7 except that a mixture of 1 part tetrakis-(methyl ethyl ketoximino) silane (45% silane in toluene) and 4.5 parts methyl tris-(methyl ethyl ketoximino) silane is used as the crosslinker.

Composition #10: This material is prepared similarly to composition #9 except that gamma-aminopropyltrimethoxysilane is used in place of adhesion promoter B.

The freshly prepared sheets are allowed to cure as described in Example I. Results as shown in Table II are measured by the same methods as described in Example I.

TABLE II

| Composition # | Hardness (Shore A) | Elongation @ break (%) | Force @ break (N/mm2) | Tensile @ 100% elongation (N/mm2) | SOT (min) | TFT (min) | Scratch (min) |
|---|---|---|---|---|---|---|---|
| #5 | 18 | 370 | 1.23 | 0.37 | 6 | 15 | 21 |
| #6 | 17 | 645 | 1.75 | 0.32 | 2 | 14 | 42 |
| #7 | 13 | 436 | 1.16 | 0.25 | 14 | 27 | 27 |
| #8 | 13 | 585 | 1.13 | 0.25 | 16 | 26 | 44 |
| #9 | 16 | 258 | 0.93 | 0.31 | 13 | 22 | 18 |
| #10 | 17 | 344 | 1.03 | 0.32 | 5 | 10 | 14 |
| AFTER AGEING 21 DAYS @ 50° C. | | | | | | | |
| #5 | 21 | 326 | 1.16 | 0.40 | 6 | 10 | 16 |
| #6 | 17 | 487 | 1.33 | 0.34 | 4 | 11 | 43 |
| #7 | 16 | 389 | 1.06 | 0.30 | 6 | 16 | 21 |
| #8 | 12 | 658 | 1.01 | 0.20 | 18 | 79 | 261 |
| #9 | 17 | 328 | 1.23 | 0.35 | 9 | 11 | 14 |
| #10 | 17 | 431 | 1.11 | 0.30 | 6 | 12 | 38 |

Compositions #5 through #10 demonstrate the stability of cure times that can be achieved when adding ketoxime substituted aminoalkyl silanes to compositions that contain vinyl tris-(methyl ethyl ketoximino) silane, tetrakis-(methyl ethyl ketoximino) silane or phenyl tris-(methyl ethyl ketoximino) silane.

In each composition that contains ketoxime substituted aminoalkyl silane, the scratch time is much less than the same compositions that contain the amino alkyl alkoxy silane (after oven ageing). Also the difference between skin time and scratch time is less than 30 minutes after oven ageing for the compositions containing adhesion promoter B. This demonstrates the desirable characteristic of maintaining crack resistance over longer periods of time when ketoxime substituted aminoalkyl silane is used and used in the correct order of addition.

EXAMPLE 3

A series of compositions are prepared employing the same method of mixing as described in Example I. Composition #11: A polydiorganosiloxane which is at least 80 percent endblocked with triorganosiloxy groups (85.9 parts) having a viscosity at 25° C. of 14,000 centipoises is thoroughly mixed with adhesion promoter A (1 part) for 10 minutes under vacuum similarly as in composition #1.

Methyl tris-(methyl ethyl ketoximino) silane (5 parts) is added to the composition and mixed for 10 minutes under vacuum. Fumed silica (130 m2/gm) is added next (8 parts) in similar manner as described in composition #1. Dibutyltin dilaurate (0.10 parts) is added last in a similar manner as composition #1.

Composition #12: This material is prepared identical to composition #11 except that gamma-aminopropyltrimethoxysilane used in place of adhesion promoter A.

Composition #13: This composition is prepared similarly as composition #11 except that the order of addition was changed for the adhesion promoter A. (Ingredients and amount of each ingredient is the same as composition #1). Adhesion promoter A is added after the addition of fumed silica. That is, methyl tris-(methyl ethyl ketoximino) silane is added to the polymer and mixed 10 minutes under vacuum. Fumed silica is added similarly as in composition #11 followed by the addition of adhesion promoter A. Dibutyltindilaurate is then added last and mixed under vacuum for 10 minutes (0.1 parts).

Composition #14: This material is prepared similarly to composition #1 except that the polymer (43.95 parts) and plasticizer (13 parts) are mixed with adhesion promoter B (1 part) for 10 minutes under vacuum. Methyl tris-(methyl ethyl ketoximino) silane (4 parts) is then added to the mixture and mixed under vacuum for 10 minutes. A stearate treated CaCO$_3$ filler of about 3 micron average particle (35 parts) is then added to the mixture and mixed under vacuum for 5 minutes. Fumed silica as used in composition #1 is then added (3 parts) and mixed for 10 minutes as in composition #1. Dibutyltindilaurate (0.05 part) is added and mixed last as in composition #1.

Composition #15: This material is prepared similarly to composition #14 except that gamma-aminopropyltrimethoxysilane is used in place of adhesion promoter B.

Composition #16: This material is prepared similarly to composition #1 except that the polymer (65.9 parts) and plasticizer (20 parts) are mixed with adhesion promoter C (1 part) for 10 minutes under vacuum. Methyl tris-(methyl ethyl ketoximino) silane (4 parts) is premixed with 1 part of the following alkoxy oxime silane composition:

0.4% methylethylketoxime 7.4% tetraethoxysilane 29.8% triethoxy mono-(methyl ethyl ketoximino) silane 51.8% diethoxy bis-(methyl ethyl ketoximino) silane 5.4% ethoxy tris-(methyl ethyl ketoximino) silane 5.2% high boilers and mixed under vacuum for 10 minutes with the previous mixture of polymer, plasticizer and adhesion promoter C. Fumed silica (8 parts) is then added as in composition #1. Dibutyltindilaurate is then added last (0.1 parts) and mixed as in composition #1.

Adhesion promoter C has the following composition:

6.3% methyl ethyl ketoxime 38.69% gamma-aminopropyl diethoxy-(methyl ethyl ketoximino) silane 42.43% gamma-aminopropyl di-(methyl ethyl ketoximino)-ethoxy silane 3.84% tetrakis-(methyl ethyl ketoximino) silane 2.3% dimers and high boilers 6.44% gamma-aminopropyltriethoxysilane Composition #17: This material is prepared similarly to composition #16 except that gamma-aminopropyltriethoxysilane is used in place of adhesion promoter C.

The freshly prepared sheets are allowed to cure as described in Example I. Results as shown in Table III are measured by the same methods as described in Example I.

TABLE III

| Composition # | Hardness (Shore A) | Elongation @ break (%) | Force @ break (N/mm2) | Tensile @ 100% elongation (N/mm2) | SOT (min) | TFT (min) | Scratch (min) |
| --- | --- | --- | --- | --- | --- | --- | --- |
| #11 | 15 | 388 | 1.29 | 0.27 | 42 | 54 | 44 |
| #12 | 16 | 423 | 1.07 | 0.31 | 7 | 54 | 160 |
| #13 | 21 | 917 | 2.10 | 0.32 | 5 | 44 | 300 |
| #14 | 25 | 403 | 1.23 | 0.41 | 9 | 10 | 9 |
| #15 | 23 | 567 | 1.30 | 0.39 | 15 | 63 | 130 |
| #16 | 19 | 355 | 1.37 | 0.37 | 11 | 16 | 19 |
| #17 | 20 | 399 | 1.30 | 0.35 | 6 | 30 | 55 |
| AFTER AGEING 21 DAYS @ 50° C. | | | | | | | |
| #11 | 18 | 346 | 1.13 | 0.35 | 27 | 34 | 40 |
| #12 | 19 | 404 | 1.12 | 0.33 | 10 | 68 | 90 |
| #13 | 21 | 476 | 1.28 | 0.37 | 8 | 55 | 169 |
| #14 | 24 | 336 | 0.98 | 0.44 | 11 | 15 | 14 |
| #15 | 23 | 456 | 1.12 | 0.41 | 15 | 63 | 87 |
| #16 | 19 | 296 | 1.17 | 0.41 | 8 | 16 | 17 |
| #17 | 16 | 358 | 1.11 | 0.35 | 14 | 53 | 81 |

From the data in TABLE III it can be seen (with compositions #11, #12 and #13) the effect of using ketoximino substituted aminoalkyl alkoxy silane, is the same for silicone polymers with both hydroxyl and triorganosiloxy end blocking. Composition #14 demonstrates how a very fast and desirable cure profile can be obtained without the use of tetrafunctional or vinylfunctional crosslinkers. Composition #16 demonstrates how the aminosilanes of this invention can be used effectively with crosslinkers containing both oxime and alkoxy hydrolyzable groups.

EXAMPLE 4

Composition #18 This material is prepared similarly to composition #5 except that adhesion promoter C is used in place of adhesion promoter B and that no catalyst (dibutyltindilaurate) is used. All other weights and ingredients were the same except that 66 parts of polymer is used in this composition instead of the 65.95 parts used in composition #5.

Composition #19: This material is prepared similarly to composition #18 except that adhesion promoter C is added last to the composition. That is, vinyl tris-(methyl ethyl ketoximino) silane is added together with plasticizer and polymer and mixed 10 minutes under vacuum. Fumed silica is added and mixed under vacuum followed by adhesion promoter C.

Composition #20: This material is prepared similarly to composition #18 except that adhesion promoter C is mixed directly with the polymer first for 10 minutes under vacuum. Next vinyl tris-(methyl ethyl ketoximino) silane is added and mixed for 10 minutes under vacuum. Plasticizer is added next and mixed under vacuum for 5 minutes. Fumed silica is added last and mixed under vacuum for 5 minutes. All weights and ingredients are the same as in composition #18.

Composition #21: This material is prepared similarly to composition #18 except that gamma-aminopropyltriethoxysilane is used in place of adhesion promoter C.

Composition #22: This material is prepared similarly to composition #19 except that gamma-aminopropyltriethoxysilane is used in place of adhesion promoter C.

Composition #23: This material is prepared similarly to composition #1 except that the crosslinker methyl tris-(methyl ethyl ketoximino) silane is added at a level of 4.5 parts. The polymer is used at a level of 66.4 parts.

The freshly prepared sheets are allowed to cure as described in Example I. Results as shown in Table IV are measured by the same methods as described in Example I.

TABLE IV

| Composition # | Hardness (Shore A) | Elongation @ break (%) | Force @ break (N/mm2) | Tensile @ 100% elongation (N/mm2) | SOT (min) | TFT (min) | Scratch (min) |
| --- | --- | --- | --- | --- | --- | --- | --- |
| #18 | 22 | 409 | 1.47 | 0.39 | 9 | 11 | 46 |
| #19 | 22 | 426 | 1.20 | 0.40 | 4 | 22 | 158 |
| #20 | 22 | 341 | 1.11 | 0.38 | 6 | 15 | 39 |
| #21 | 20 | 586 | 1.83 | 0.35 | 4 | 16 | 40 |
| #22 | 23 | 609 | 1.76 | 0.36 | 5 | 14 | 29 |
| #23 | 13 | 393 | 1.10 | 0.24 | 28 | 40 | 30 |
| AFTER AGEING 21 DAYS @ 50° C. | | | | | | | |
| #18 | 21 | 315 | 1.15 | 0.42 | 4 | 12 | 24 |
| #19 | 20 | 444 | 1.20 | 0.38 | 4 | 21 | 133 |
| #20 | 22 | 284 | 0.98 | 0.41 | 4 | 12 | 20 |
| #21 | 16 | 475 | 1.12 | 0.31 | 6 | 22 | 137 |
| #22 | 17 | 517 | 1.19 | 0.30 | 9 | 22 | 120 |
| #23 | 15 | 368 | 0.98 | 0.28 | 22 | 30 | 35 |

It can be seen from the data in Table IV that using a ketoxime substituted aminoalkyl ethoxy silane with vinyl tris-(methyl ethyl ketoximino) silane that a very fast and stable scratch time can be achieved without a tin catalyst. Composition #20 also demonstrates how plasticizer can be added in different orders of addition and not negatively affect the cure stability. Composition #23 demonstrates how lower levels of crosslinker can improve the scratch time.

What is claimed is:

1. A storage stable silicone composition which is curable to an elastomer in the presence of moisture which comprises:

(A) at least one silanol terminated diorganosiloxane polymer in an amount sufficient to form a silicone composition which is curable to an elastomer upon crosslinking;

(B) at least one silane crosslinking agent, present in an amount sufficient to crosslink the diorrganosiloxane polymer in the presence of moisture, having the formula $R_{4-n}Si(OR')_p(ON=CR''R''')_{n-p}$ wherein R and R' independently of each other may be any saturated straight chain or branched alkyl radical having 1 to 8 carbon atoms, n is 3 or 4, p is 0 to 3 wherein the sum of n and p is at least 3, and R" and R'" independently of each other may be any saturated straight chain or branched alkyl radical of 1 to 8 carbon atoms;

(C) at least one filler in an amount sufficient to thicken the silicone composition; and (D) at least one aminohydrocarbyl substituted ketoximinosilane adhesion promoter, present in an amount sufficient to increase the adhesion of the composition to a substrate, having the formula $(R^3R^4C=NO)_xR^5_{(3-x)}SiR^6NHR^7$, wherein $R^3$ and $R^4$ are identical or different monovalent straight chain or branched hydrocarbon radicals containing from 1 to 8 carbon atoms, $R^s$ is a monovalent hydrocarbon radical, a monovalent fluorinated hydrocarbon radical, or an alkoxy group containing from 1 to 4 carbon atoms, provided that when more than one $R^5$ substituent is present, these substituents may be identical or different, $R^6$ is a divalent hydrocarbon radical containing from 2 to 20 carbon atoms, $R^7$ is a monovalent hydrocarbon radical or a hydrogen atom, and x is 1, 2, or 3.

2. The composition of claim 1 comprising:

(A) from about 15 to about 90 percent by weight of the composition of one or more polymers having an average viscosity of 100 to 500.000 centipoise at 25° C. selected from the group consisting of (i) polydiorganosiloxane having terminal silicone-bonded hydroxyl groups wherein the organo radicals bonded to the silicon atom are selected from the group consisting of monovalent hydrocarbon radicals and monvalent halogenated hydrocarbon radicals on the polydiorganosiloxane and (ii) polydiorganosiloxane which have both hydroxyl endblocking and triorganosiloxy endblocking;

(B) from about 2 to about 20 percent by weight of the composition of the at least one silane crosslinking agent;

(C) the at least one filler selected from the group consisting of (i) from about 0 to about 20 percent by weight of the composition of one or more reinforcing silica fillers and (ii) from about 0 to about 70 percent by weight of the composition of one or more non-reinforcing or semi-reinforcing fillers; such that the total amount of such fillers ranges from about 3 to about 70 percent by weight of the composition; and (D) from about 0.5 to about 5 percent by weight of the composition of the at least one aminohydrocarbyl substituted ketoximinosilane adhesion promoter.

3. The composition of claim 2 further comprising up to about 2 percent by weight of the total composition of one or more catalysts (E) which accelerate the reaction of (A) with (B) in the presence of moisture.

4. The composition of claim 2 further comprising up to about 40 percent by weight of the total composition of one or more plasticizers.

5. The composition of claim 4 wherein the plasticizer is a triorganosilyl endblocked diorganopolysiloxane having a viscosity ranging from 10 to 100,000 centipoise at 25° C.

6. The composition of claim 5 wherein the plasticizer is a triorganosilyl endblocked diorganopolysiloxane wherein the organo groups are selected from the group consisting of alkyl radicals of 1 to 8 carbons, alkenyl radicals, vinyl, cycloalkyl, and haloalkyl radicals and has a viscosity of from 100 to 1000 centipoise at 25° C.

7. The composition of claim 2 wherein the polydiorganosiloxane of (A) is at least 80 percent endblocked with triorganosiloxy groups.

8. The composition of claim 2 wherein $R^3$ and $R^4$ are identical or different monovalent straight chained or branched hydrocarbon radicals containing 1 to 20 carbons atoms.

9. The composition according to claim 8 wherein $R^3$ and $R^4$ together form a cycloalkyl group.

10. A method of producing a silicone composition which is curable to an elastomer in the presence of moisture which comprises:

I.) first forming a mixture of the following components A and D:

(A) at least one silanol terminated diorganosiloxane polymer in an amount sufficient to form a silicone composition which is curable to an elastomer upon crosslinking; and (B) at least one silane crosslinking agent in an amount sufficient to crosslink the diorganosiloxane polymer in the presence of moisture;

(C) at least one filler in an amount sufficient to thicken the silicone composition; and (D) at least one aminohydrocarbyl substituted ketoximinosilane adhesion promoter in an amount sufficient to increase the adhesion of the composition to a substrate; and II.) thereafter adding components B and C to said mixture in either order.

11. The method of claim 10 which comprises:

I.) first forming a mixture of the following components A and D:

A) from about 15 to about 90 weight percent of one or more polymers having an average viscosity of 100 to 500,000 centipoise at 25° C. selected from the group consisting of (i) polydiorganosiloxane having terminal silicon-bonded hydroxyl groups wherein the organo radicals bonded to the silicon atom are selected from the group consisting of monovalent hydrocarbon radicals and monovalent halogenated hydrocarbon radicals on said polydiorganosiloxane and (ii) polydiorganosiloxanes which have both hydroxyl endblocking and triorganosiloxy endblocking;

B) from about 2 to about 20 weight percent of one or more silane crosslinking agents having the formula $R_{4-n}Si(OR')_p(ON=CR''R''')_{n-p}$, where R and R', independently of each other, may be any saturated, straight chain or branched alkyl radical having 1 to 8 carbon atoms, n is 0 to 4, p is 0 to 3 where the sum of n and p is at least three, and R" and R'", independently of each other, may be any saturated straight chain or branched alkyl radical of 1 to 8 carbon atoms;

C) one or more fillers selected from the group consisting of
(i) from about 0 to about 20 weight percent of the overall composition of one or more reinforcing silica fillers and
(ii) from about 0 to about 70 weight percent based on the weight of the overall composition of one or more non-reinforcing or semi-reinforcing fillers such that the total amount of such fillers ranges from about 3 to about 70 weight percent based on the weight of the overall composition; and D) from about 0.5 to about 5 weight percent of at least one adhesion promoter which is an aminohydrocarbyl-substituted ketoximinosilane represented by the formula $(R^3R^4C=NO)_xR^5_{(3-x)}SiR^6NHR^7$, where $R^3$ and $R^4$ are identical or different monovalent straight chained or branched hydrocarbon radicals containing from 1 to 8 carbon atoms, $R^5$ is a monovalent hydrocarbon radical, a monovalent fluorinated hydrocarbon radical, or an alkoxy group containing from 1 to 4 carbon atoms, with the proviso that when more than one $R^5$ substituent is present these substituents can be identical or different, $R^6$ is a divalent hydrocarbon radical containing from 2 to 20 carbon atoms, $R^7$ is a monovalent hydrocarbon radical or a hydrogen atom, and x is the integer of 1, 2 or 3;

II.) thereafter adding components B and C to said mixture in either order.

12. The method of claim 11 which comprises blending up to about 40 percent by weight of the total composition of one or more plasticizers with polymer component A before forming the mixture with component D.

13. The method according to claim 11 further comprising subsequently adding up to about 2 percent by weight of the total composition of one or more catalysts which accelerate the reaction of (A) with (B) in the presence of moisture.

14. The method according to claim 11 wherein the plasticizer is a triorganosilyl endblocked diorganopolysiloxane having a viscosity ranging from 10 to 100,000 centipoise at 25° C.

15. The method according to claim 11 wherein the plasticizer is a triorganosilyl endblocked diorganopolysiloxane wherein the organo groups are selected from the group consisting of alkyl radicals of 1 to 8 carbons, alkenyl radicals, vinyl, cycloalkyl, and haloalkyl radicals and has a viscosity of from 100 to 1000 centipoise at 25° C.

16. A method of producing a silicone composition which is curable to an elastomer in the presence of moisture which comprises:

I.) first forming a mixture of the components A, B and C:
(A) at least one silanol terminated diorganosiloxane polymer in an amount sufficient to form a silicone composition which is curable to an elastomer upon crosslinking; and
(B) at least one silane crosslinking agent in an amount sufficient to crosslink the diorganosiloxane polymer in the presence of moisture;
(C) at least one filler in an amount sufficient to thicken the silicone composition; and
(D) at least one aminohydrocarbyl substituted ketoximinosilane adhesion promoter in an amount sufficient to increase the adhesion of the composition to a substrate; and II.) thereafter adding component D to said mixture.

17. The method of claim 16 which comprises:
I.) first forming a mixture of components A, B, and C:
A.) from about 15 to about 90 percent by weight of the mixture of one or more polymers having an average viscosity of 100 to 500,000 centipoise at 25° C. selected from the group consisting of
(i) polydiorganosiloxane having terminal silicone-bonded hydroxyl groups wherein the organo radicals bonded to the silicon atom are selected from the group consisting of monovalent hydrocarbon radicals and monovalent halogenated hydrocarbon radicals on said polydiorganosiloxane and
(ii) polydiorganosiloxanes which have both hydroxyl endblocking and triorganosiloxy endblocking;

B.) from about 2 to about 20 percent by weight of the mixture of one or more silane crosslinking agents having the formula $R_{4-n}Si(OR')_p(ON=CR"R''')_{n-p}$, where R and R', independently of each other, may be saturated, straight chain or branched alkyl radical having 1 to 8 carbon atoms, n is 0, to 4, p is 0 to 3 where the sum of n and p is at least three, and R" and R''', independently of each other, may be any saturated straight chain or branched alkyl radical of 1 to 8 carbon atoms;

(C) one or more fillers selected from the group consisting of
(i) from about 0 to about 20 percent by weight of the mixture of one or more reinforcing silica fillers and
(ii) from about 0 to about 70 percent by weight based on the weight of the mixture of one or more non-reinforcing or semi-reinforcing fillers; such that the total amount of such fillers ranges from about 3 to about 70 percent by weight of the mixture; and (D) from about 0.5 to about 5 percent by weight of the mixture of at least one adhesion promoter which is an aminohydrocarbyl-substituted ketoximinosilane represented by the formula $(R^3R^4C=NO)_xR^5_{(3-x)}SiR^6NHR^7$, where $R^3$ and $R^4$ are identical or different monovalent straight chained or branched hydrocarbon radicals containing from 1 to 8 carbon atoms, $R^5$ is a monovalent hydrocarbon radical, a monovalent fluorinated hydrocarbon radical, or an alkoxy group containing from 1 to 4 carbon atoms, with the proviso that when more than one $R^5$ substituent is present these substituents can be identical or different, $R^6$ is a divalent hydrocarbon radical containing from 2 to 20 carbon atoms, $R^7$ is a monovalent hydrocarbon radical or a hydrogen atom, and x is the integer of 1, 2, or 3; and II. ) thereafter adding component D to said mixture.

18. The method of claim 17 which comprises blending up to about 40 percent by weight of the total composition of one or more plasticizers with said mixture prior to adding component D.

19. The method according to claim 17 further comprising subsequently adding up to about 2 percent by weight of the total composition of one or more catalysts which accelerate the reaction of (A) with (B) in the presence of moisture.

20. The method according to claim 17 wherein the plasticizer is a triorganosilyl endblocked diorganopolysiloxane wherein the organo groups are selected from the group consisting of alkyl radicals of 1 to 8 carbons, alkenyl radicals, vinyl, cycloalkyl, and haloalkyl radicals and has a viscosity of from 100 to 1000 centipoise at 25° C.

21. A storage stable silicone composition which is curable to an elastomer in the presence of moisture which comprises;

(A) at least one silanol terminated diorganosiloxane polymer in an amount sufficient to form a silicone composition which is curable to an elastomer upon crosslinking; and (B) at least one aminohydrocarbyl substituted ketoximinosilane adhesion promoter in an amount sufficient to increase the adhesion of the composition to a substrate.

* * * * *